United States Patent [19]
Hauser

[11] Patent Number: 6,060,694
[45] Date of Patent: May 9, 2000

[54] DEVICE FOR HEATING UP TOOL HOLDER

[75] Inventor: Hermann Hauser, Teningen, Germany

[73] Assignee: Hauser GmbH Werkzeug - Formen -und Maschinenbau, Teningen, Germany

[21] Appl. No.: 09/040,824

[22] Filed: Mar. 18, 1998

[30] Foreign Application Priority Data

Mar. 21, 1997 [DE] Germany ............ 297 05 185

[51] Int. Cl.$^7$ .................................................. H05B 1/00
[52] U.S. Cl. .......................................................... 219/221
[58] Field of Search ........................ 219/221, 200, 219/201, 227–231, 243, 524, 526, 533, 535; 279/9.1; 409/234; 403/273

[56] References Cited

U.S. PATENT DOCUMENTS

| | | | |
|---|---|---|---|
| 3,654,429 | 4/1972 | Strachan | 392/409 |
| 4,818,161 | 4/1989 | Cook. | |
| 5,032,702 | 7/1991 | Scholz | 219/85.22 |
| 5,277,435 | 1/1994 | Kramer et al. | 279/9.1 |
| 5,280,671 | 1/1994 | Marquart | 29/447 |
| 5,311,654 | 5/1994 | Cook | 29/447 |
| 5,582,494 | 12/1996 | Cook | 409/234 |

FOREIGN PATENT DOCUMENTS

| | | |
|---|---|---|
| 0 437 322 A2 | 7/1991 | European Pat. Off. . |
| 0 437 322 A3 | 7/1991 | European Pat. Off. . |
| 39 25 641 A1 | 8/1990 | Germany . |
| 39 25 641 C2 | 9/1992 | Germany . |
| 42 15 607 C1 | 11/1993 | Germany . |
| 42 32 790 C1 | 2/1994 | Germany . |
| 195 28 824 A1 | 2/1997 | Germany . |

*Primary Examiner*—Teresa Walberg
*Assistant Examiner*—Vinod D. Patel
*Attorney, Agent, or Firm*—Panitch, Schwarze, Jacobs & Nadel, P.C.

[57] ABSTRACT

A device (1) is provided for heating up a tool holder which is part of a tool clamping chuck. Tool clamping chucks of this type have a coupling part which can be inserted into a machine tool. The tool holder, which can be removed from the chuck or is connected to it, is cylindrical or conical, for example, and has a coaxial fitting hole for receiving the shaft of an interchangeable tool, for example a drill or hob. The device (1) has a heating unit (2) to heat up and thus expand the tool holder and its fitting hole. Furthermore, the device (1) has an insert (3) with an exactly fitting internal receptacle opening (4), in particular for a planar contact with the outer side of the tool holder. This insert is made of a heat-conducting material or metal which can be heated with the heating unit (2), so that the heat energy transferred via this insert can be transferred in a uniform, quick and targeted manner, as well as in the desired dosing, to the tool holder.

12 Claims, 5 Drawing Sheets

DEVICE FOR HEATING UP TOOL HOLDER

BACKGROUND OF THE INVENTION

The invention involves a device for heating up a tool holder which is part of—or connected to—a tool clamping chuck, which tool clamping chuck has a coupling part insertable into a machine tool, and the tool holder, which is cylindrical or conical, for example, having a coaxial fitting hole for receiving the shaft of any interchangeable tool—for example, a drill, hob, or similar metal removing tool. The device has a heating unit to heat up and expand the tool holder and its fitting hole.

Devices of this type are known in practice and function for heating up the tool holder of a tool clamping chuck and thereby, in particular, for expanding the fitting hole in such a way that a non-heated tool, which is in contrast cooler than the tool holder, can be inserted simply and easily and after the subsequent cooling off of the tool holder is fixed by its contraction.

A device is known, for example, in which a hot air blower is provided for heating, by which hot air is blown against the part of the tool clamping chuck which is to be expanded by the heating, in order to be able subsequently to perform the fastening of the tool by contraction. This is costly and relatively tedious, since air transfers heat poorly, so that on the whole, an unfavorable degree of efficiency results. Moreover, there is the danger of non-uniform heating.

It is further known to subject the part of the tool clamping chuck which is to be heated to the effect of a gas flame, wherein the tool clamping chuck is turned relative to this gas flame. Thus, a rotating device is necessary, and in particular, heating is done using an open flame, which is not desirable in many workshops. In addition, considerable thermal stresses can occur on the tool holder due to an open gas flame, and under certain conditions, even too strong a heating can result, which can possibly lead to microstructural changes in the tool holder.

In these devices and methods known thusfar, it is also seen as unfavorable that the re-heating of the tool holder to remove the tool takes a relatively long time, and that the tool is also heated in the process, so that relatively high separation forces would be necessary.

SUMMARY OF THE INVENTION

Therefore, the goal arises of creating a device of the type described at the outset, which is easy to handle, and makes possible a quick and targeted heating which is as precise as possible, in particular only of the tool holder, both during attachment and detachment of the tool, without the tool itself being heated as well in any appreciable way, so that the separation of the tool holder and tool is also simplified.

This goal is achieved in that the device has an insert with an exactly fitting internal receptacle opening and a planar contact area on the outer side of the tool holder, and in that this insert is made from a good heat-conducting material or metal, and can be heated with the heating unit.

The tool holder of a tool clamping chuck can thus be inserted to fit exactly in the insert and there surface-contacted and impinged, so that the heat energy transferred via this insert can be transferred to the tool holder uniformly, quickly and in a targeted manner, as well as in the desired dosing. The tool holder can thus expand at an essentially predetermined speed because of the heat applied, so that an essentially uniform enlargement of its fitting hole results for the tool. The tool can be inserted in a correspondingly fast and simple manner, so that it also achieves a uniform and solid connection in the subsequent cooling via this process of contraction. An open flame is likewise avoided, as is a relatively costly heating using hot air.

Interchanging tools can be done in an especially favorable manner with the device according to the invention, since the heating of the tool holder using the adjacent insert practically does not reach the tool until the tool holder is sufficiently heated, which, however, then readily leads to a gap between this tool holder and the tool, and insulates the tool from the tool holder. A simultaneous heating of the tool is thus eliminated to the greatest degree possible or is only possible to a very limited extent, so that the contraction attachment can be quickly and effectively loosened.

In order to heat the insert, and thus the tool holder, an electrical heating unit can be provided. This makes possible a heat transfer to the insert which is especially uniform and insulated from the outside.

For this purpose, a functional and simple design can be such that the heating unit is arranged on the outer side of the insert approximately concentrically to the inner opening of the insert, and in particular, is constructed as a heating coil or preferably an electrical heating band. In particular, a heating band can transfer the heat energy effectively and quickly to the heating insert by direct contact with the outer side of the insert. The heat energy is thus not—as when using a gas flame—applied directly to the tool holder itself, but instead is transferred by means of the insert in a planar, targeted and uniform manner. In this process, the electrical heating unit is itself screened from the tool holder at the same time by the insert, and can thus not be impaired by the insertion and detachment of the tool holder.

Functionally, the inner opening can run through the entire insert and be open toward both ends. Admission of tool holders having different lengths is thereby possible.

In addition, the insert can be arranged to be detachable and interchangeable in a housing of the device. It is thereby possible in the same device to select the use of inserts which have inner openings of different dimensions for different sized tool holders.

Another embodiment of the invention having considerable significance, and to accelerate the work operation to be performed, can consist in that the insert and the housing which contains it, possibly also the heating unit, is divided in a longitudinally central or diametrical plane in which the middle axis of the receptacle opening also runs, and the parts of the insert and its housing can be separated from each other and moved apart. This makes it possible to separate the insert from the heated tool holder while the insert is still hot, although both parts at first also enter into a type of contraction connection by the heat expansion of the tool holder. They can be detached without problems by opening the insert in spite of the heating.

Possibilities of this separability of the separate parts of the insert include providing for either a pivoting of the two insert parts relative to each other or else a sliding movement to move these parts apart.

The insert, its heating unit and the housing can have a handle through which, possibly, the conduction of current for the electrical heating unit is also carried out. This makes it possible for the user to quickly operate the respectively present tool clamping chucks and their tool holders on different machines or machine tools and/or to take tools out of these holders and replace them with other tools.

It is also possible, however, that the device be constructed as a stationary device, especially if many tool exchanges are occurring and a central operation of this tool exchange is feasible.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, which are partially schematic.

DETAILED DESCRIPTION OF THE INVENTION

Figure 1:
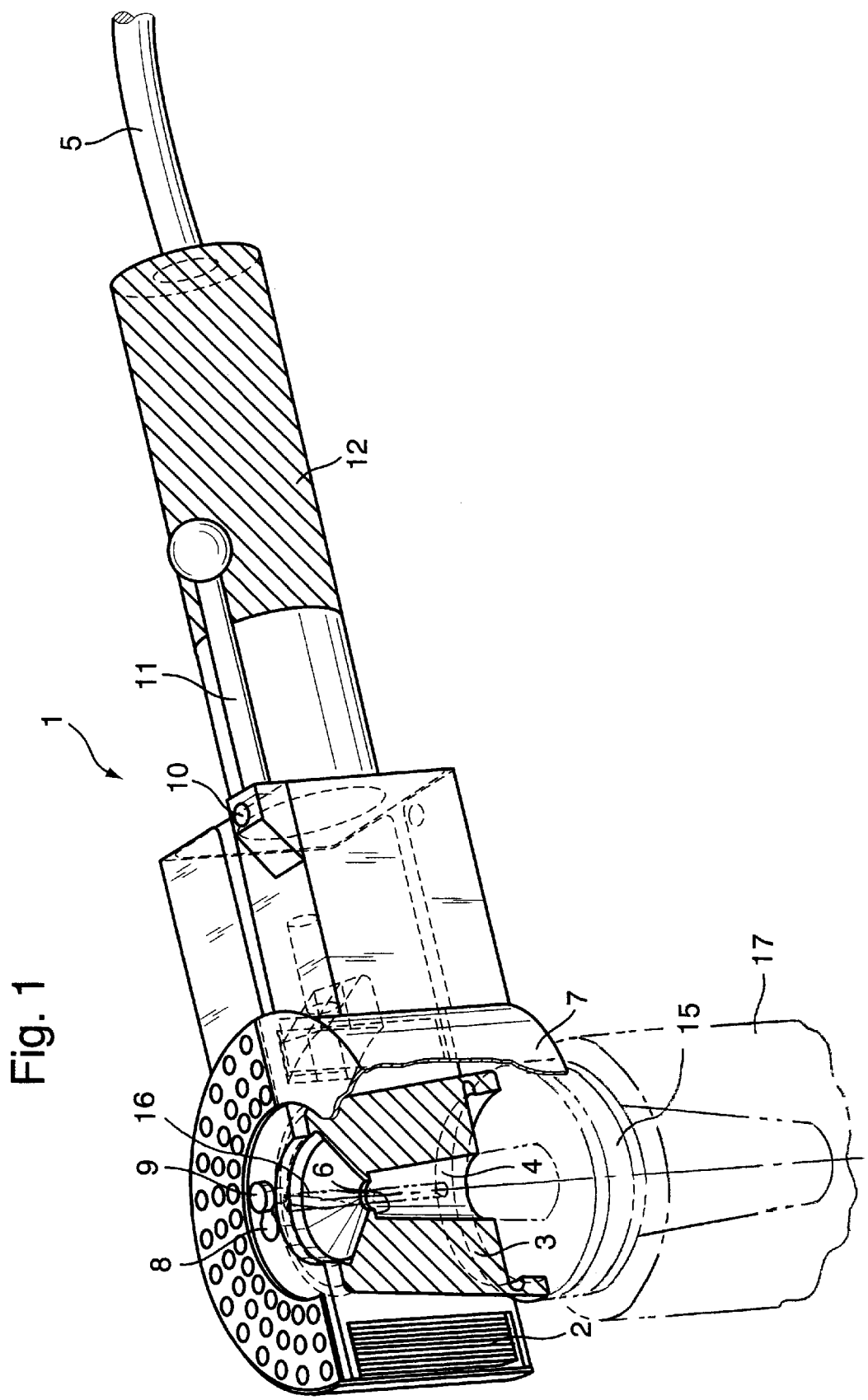
FIG. 1 shows, in a diagrammatic and partially broken-away representation, a device according to the invention for heating up the tool holder of a tool clamping chuck using an insert which has an inner opening and can be heated electrically on the outside, which surface contacts the outside of the tool holder of a tool clamping chuck with the inside of the internal opening of the insert, when in the position of use.

A device designated as a whole by 1 functions for the heating up of a tool holder 15 belonging to a tool clamping chuck 17, which are shown in phantom lines FIG. 1. Tool clamping chucks of this type have, as is well known, a coupling piece which can be inserted into a machine tool, and the tool holder, which is, for example, cylindrical or conical, and can be taken from it and attached to it, has a coaxial fitting hole to receive the shaft of an interchangeable tool 16, for example a drill or a hob.

The device 1 has a heating unit 2 for heating up and thereby also for the expansion of the tool holder and its fitting hole, so that its inner diameter is enlarged. This makes it possible to easily insert the shaft of the non-heated tool into this fitting hole, so that by the subsequent cooling a contraction connection occurs, which can be loosened again later in the same manner by re-heating the tool holder.

Most of all in FIG. 1 it is recognized that the device 1 has an insert 3 with an exactly fitting inner receptacle opening 4 for surface contact on the outside of the aforementioned tool holder, where this insert 3 functionally comprises a material which conducts heat well, preferably a metal, for example an aluminum alloy, and can be heated by the heating unit 2.

In FIG. 1 it is made apparent by the electric cable or the current conductor 5 that in order to heat up the insert 3 and thus the tool holder, an electric heating unit 2 is provided. This heating unit 2 is arranged according to FIG. 1 on the outer side of the insert 3 approximately concentrically to its inner opening 4 and, for example, is constructed as a heating coil or as an electrical heating band which, possibly, can lie immediately adjacent to the outer side of the insert 3, in order to transfer the heat energy in as best a manner as possible to the insert 3 and thus also to the tool holder.

It is provided in this connection that the inner opening 4 runs through the entire insert 3, i.e. is open at both ends, so that if necessary the tool holder can also project slightly. This is prevented, however, in the embodiment according to FIG. 1, by a constriction 6 at the narrower end of the inner opening 4, conical in this case, which can function simultaneously as a stop for the tool holder.

The insert 3 can be detachable using a bayonet catch and can be exchangeably arranged in a housing 7 of the device 1. Especially visible in FIGS. 2 through 5 are the holes 8 of the housing 7 belonging to the bayonet catch and enlarged on one end, which act together with the corresponding projections 9 on the insert 3 in a known way. Since the insert 3 projects slightly from the bottom of the housing 7 according to FIG. 1, it can easily be grasped and rotated far enough so that the retaining projections 9 can be moved through the enlargements of the holes 8. In the drawings, the insert 3 is located in its attached position. This interchangeability makes possible the use of inserts 3 having different sized inner openings 4, so that an adaptation to different tool holders is thus possible in a quick and simple manner.

In FIGS. 2 to 5 it is shown that the insert 3 and the housing 7 which contains it, as well as the heating unit 2, are divided in a longitudinally central and diametrical plane, in which the middle axis of the receptacle opening 4 also runs, and the parts of the insert 3 and its housing 7 with the heating unit 2, located on both sides of this separation plane, can be separated from each other or moved apart.

Figure 2:
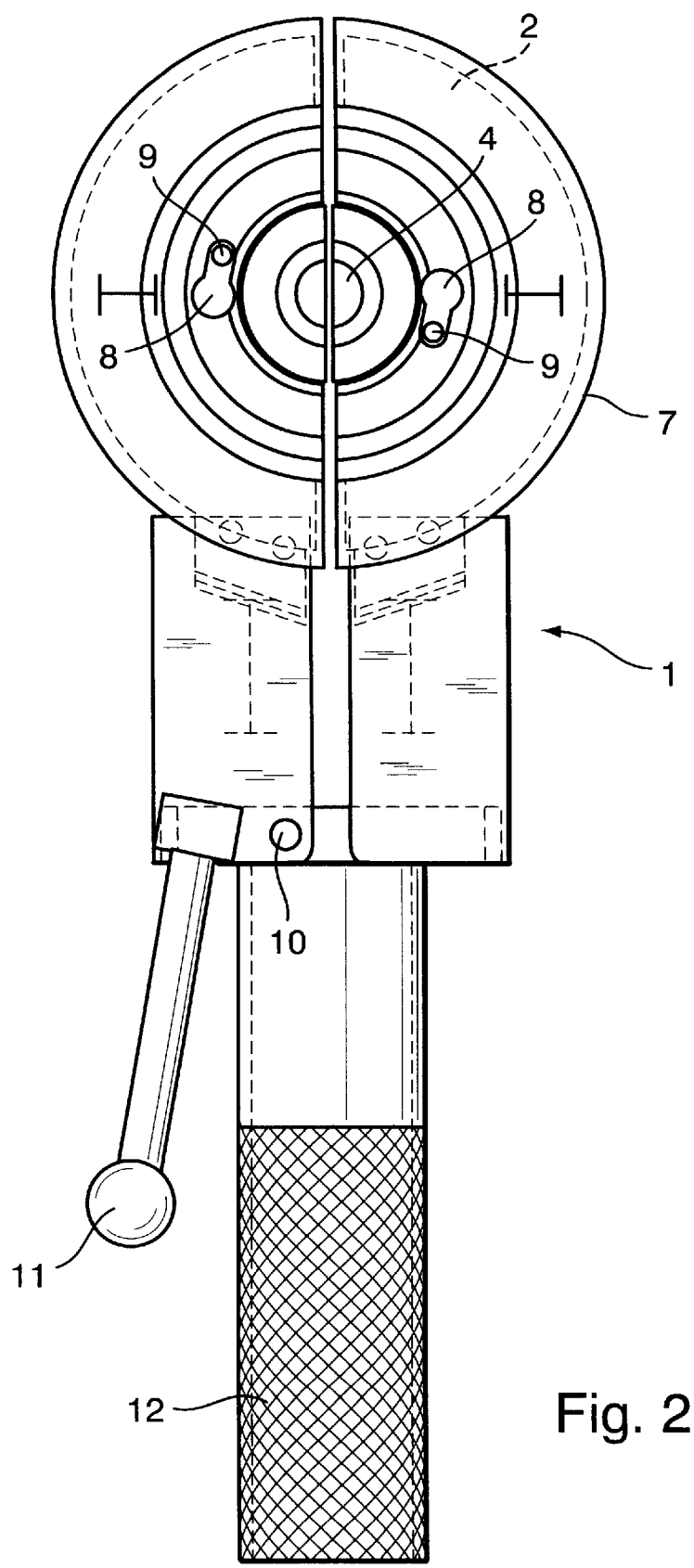
FIG. 2 is a plan view of the device according to FIG. 1 in the closed position.
Figure 3:
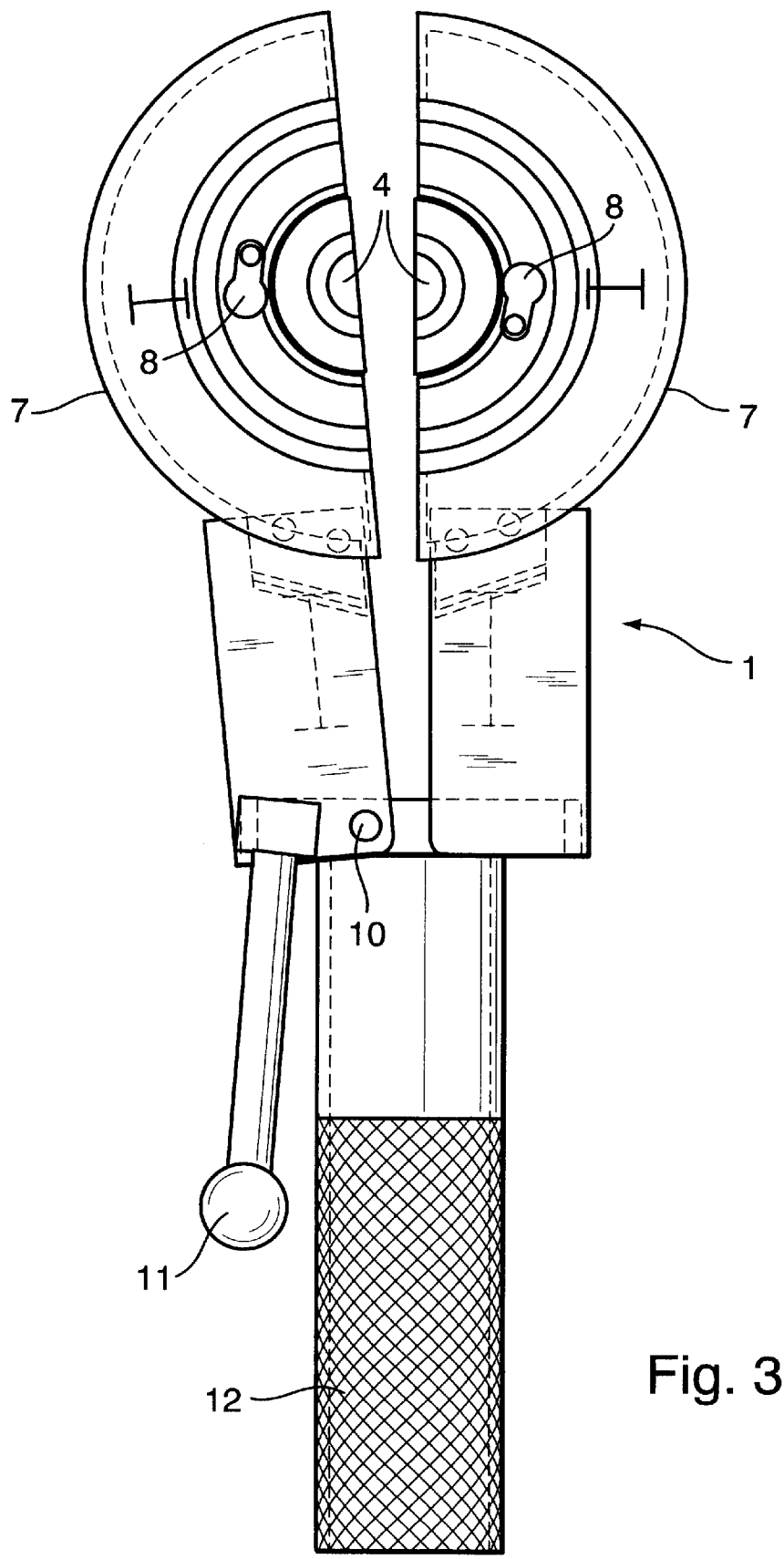
FIG. 3 is a plan view, corresponding to FIG. 2, of the device in the open position, in which one half of the insert and of the housing which receives it can be pivoted relative to the other half.

According to the embodiment of FIGS. 1 to 3, a joint 10 or hinge is arranged at a distance from the edge of the insert 3 or its housing 7, the joint having an axis running parallel to the middle axis of the inner opening 4 and around which one of the parts of the insert 3 and the associated housing 7, with part of the heating unit 2, can be pivoted relative to the other one, as is apparent by comparison of FIGS. 2 and 3. The pivotable part has for this purpose a pivot grip 11, which can be swung relative to a handle 12 of the entire hand device, such as the device 1 is constructed in the embodiment shown.

Figure 4:
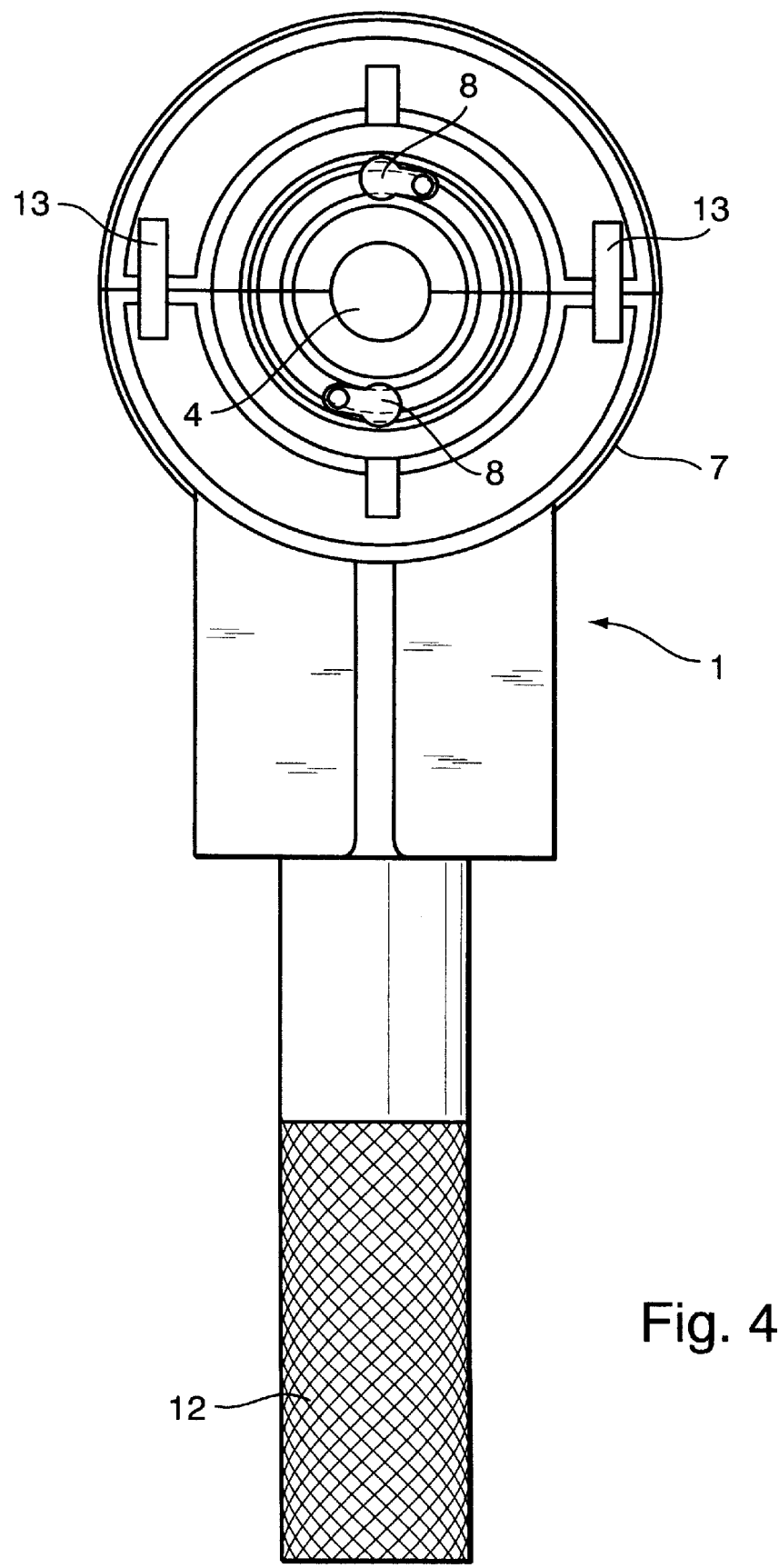
FIG. 4 is a plan view of a modified embodiment of the device according to the invention in the closed position.
Figure 5:
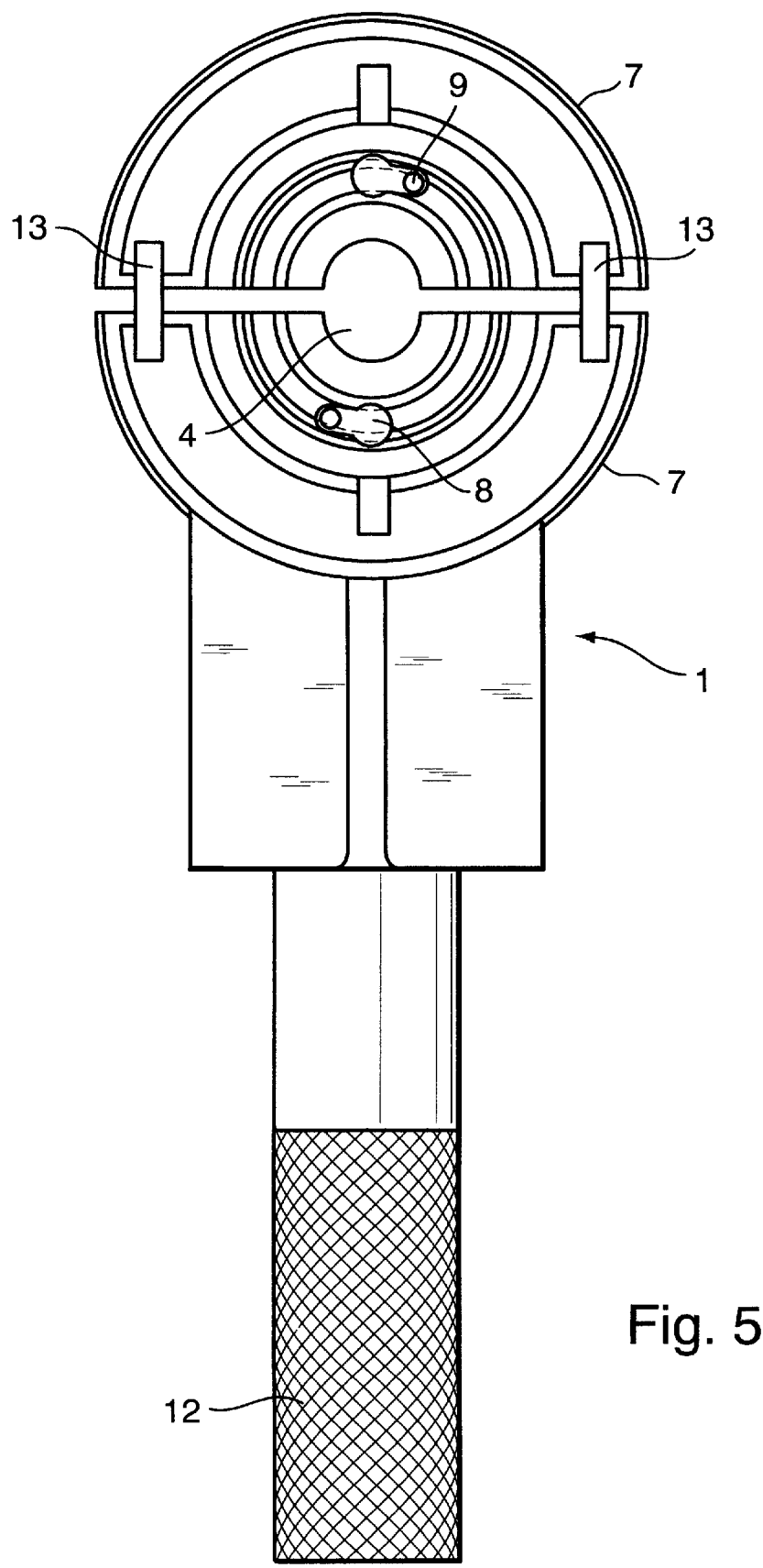
FIG. 5 is a plan view of the device according to FIG. 4 in which one half of the insert and its housing is displaced into an open position relative to the other one in the axial direction of the handle.

In FIGS. 4 and 5 a modified embodiment is shown in which the separation plane is provided rotated by 90° in relation to that of the embodiment according to FIGS. 1 to 3, i.e. running transverse to the handle 12. In this connection, a sliding guide 13 (indicated schematically) is provided on each respective side of the center at positions lying opposite each other, by means of which one part of the insert 3 and the associated housing 7, as well as the heating unit 2 contained in it, can be moved relative to the other one in the direction away from the handle 12.

It can be recognized in FIG. 3 and 5, which show respectively the open position, that by these measures the inner opening 4 is respectively expanded, that a separation of the heated tool holder from the insert 3 and thus a detachment from the device 1 is possible, although the tool holder enters into a correspondingly firm connection with the insert 3 because of its expansion by this heating. This firm connection is loosened by the separation of the insert 3, so that the heated tool holder can nevertheless be released.

The device 1 has the aforementioned handle 12, through which the likewise aforementioned current conductor 5 is guided for the electrical heating unit 2, i.e. the device 1 depicted in the embodiment is configured as a hand device. However, it could also be constructed as a stationary device.

On the whole, a device 1 results with which the attachment of a tool holder of a tool clamping chuck can be achieved quickly and effectively by planar contact with a heat body constructed as an insert 3, without an open flame or a costly heating blower being necessary. At the same time the heating up of the tool holder for detachment of a tool can be made more effective thereby, in particular since a simultaneous heating of the tool is practically eliminated, because the heat of the insert is at first intentionally and almost exclusively aimed at a tool holder of this type, so that the tool holder undergoes its expansion before the tool itself is heated and expanded to any considerable degree, so that it can be detached in a correspondingly quick manner from the device 1 and its insert 3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device (1) for heating up a tool holder associated with a tool clamping chuck having a coupling part insertable into a machine tool, the tool holder being cylindrical or conical and having a coaxial fitting hole for receiving a shaft of an interchangeable tool, the device (1) comprising a heating unit (2) to heat up and expand the tool holder and the fitting hole located therein, and an insert (3) having an exactly fitting inner opening (4) for receiving in surface contact an outer side of the tool holder, the insert (3) comprising a heat-conducting material heatable by the heating unit (2).

2. The device according to claim 1, wherein the heating unit (2) comprises an electrical heater.

3. The device according to claim 1, wherein the heating unit (2) is arranged on an outer side of the insert (3) approximately concentrically to the inner opening (4).

4. The device according to claim 3, wherein the heating unit (2) comprises a heating coil or electrical heating band.

5. The device according to claim 1, wherein the inner opening (4) runs through the entire insert (3) and is open at both ends.

6. The device according to claim 1, wherein the insert (3) is arranged so that it can be detached and replaced in a housing (7) of the device (1).

7. The device according to claim 6, wherein the insert (3) and the housing (7) are divided along a longitudinal central or diametrical plane of the device in which a middle axis of the inner opening (4) runs, and resulting parts of the insert (3) and the housing (7) are separable from each other.

8. The device according to claim 7, wherein the heating unit (2) is also divided along the longitudinal or diametrical plane of the device, and resulting parts of the heating unit (2) are separable from each other.

9. The device according to claim 7, wherein a joint is arranged at a distance from an edge of the insert (3) or the housing (7), the joint having an axis running parallel to the middle axis of the inner opening (4) and around which one of the parts of the insert (3) and the housing (7) is pivoted relative to the other part.

10. The device according to claim 7, wherein a sliding guide is provided by which one of the parts of the insert (3) and the housing (7) is moved relative to the other part.

11. The device according to claim 6, wherein the insert, the heating unit and the housing have a handle (12) through which a current conductor (5) is guided for the heating unit (2).

12. The device according to claim 1, wherein the device (1), is a stationary device.

* * * * *